(12) United States Patent
Huebner

(10) Patent No.: US 9,931,537 B2
(45) Date of Patent: *Apr. 3, 2018

(54) SPINAL HARNESS APPARATUS AND METHOD FOR CONDUCTING ACTIVITIES REQUIRING A NEUTRAL SPINAL POSITION AND SPINAL RIGIDITY

(71) Applicant: Karl William Huebner, Green Bay, WI (US)

(72) Inventor: Karl William Huebner, Green Bay, WI (US)

(73) Assignee: Karl W. Huebner, Green Bay, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/499,040

(22) Filed: Apr. 27, 2017

(65) Prior Publication Data

US 2017/0225027 A1     Aug. 10, 2017

Related U.S. Application Data

(63) Continuation of application No. 15/082,132, filed on Mar. 28, 2016, now Pat. No. 9,669,258.

(51) Int. Cl.
    *A63B 21/00*         (2006.01)
    *A63B 21/072*      (2006.01)
              (Continued)

(52) U.S. Cl.
    CPC ...... *A63B 23/0238* (2013.01); *A63B 21/0724* (2013.01); *A63B 21/4005* (2015.10);
              (Continued)

(58) Field of Classification Search
    CPC .......... A63B 21/0004; A63B 21/00069; A63B 21/00072; A63B 21/00178; A63B 21/00185; A63B 21/065; A63B 21/068; A63B 21/072; A63B 21/0724; A63B 21/08; A63B 21/4001; A63B 21/4003;
             (Continued)

(56) References Cited

U.S. PATENT DOCUMENTS 30,601 A   *   11/1860   Wright .................... A61F 5/028
                                                   128/DIG. 23
    443,764 A   *   12/1890   Hilliard .................. A61F 5/028
                                                   128/DIG. 23
                                    (Continued)

*Primary Examiner* — Loan H Thanh
*Assistant Examiner* — Gary D Urbiel Goldner

(57) ABSTRACT

A spinal harness apparatus including a strapping system and a rigid member that is worn by a user during activity. An anterior surface of the rigid member is effectively linear and planar. The anterior surface may make contact with a dorsum of the user at approximate levels of an external occipital protuberance of the user, spinous processes of mid-thoracic vertebrae of the user, and a median sacral crest of the user. The rigid member may be tubular and comprise an inner and outer component with which a total length of the rigid member may be telescopically adjustable while maintaining a linear and planar contact surface. The strapping system may comprise an adjustable belt and suspenders. The strapping system is to be adjustably affixed to the rigid member as well as worn about a torso of the user.

8 Claims, 7 Drawing Sheets

(51) Int. Cl.
| | |
|---|---|
| *A63B 23/02* | (2006.01) |
| *A63B 23/04* | (2006.01) |
| *A63B 23/18* | (2006.01) |
| *A63B 69/00* | (2006.01) |
| *A63B 71/00* | (2006.01) |
| *G09B 19/00* | (2006.01) |
| *F16B 7/10* | (2006.01) |

(52) U.S. Cl.
CPC ...... *A63B 21/4007* (2015.10); *A63B 23/0405* (2013.01); *A63B 23/18* (2013.01); *A63B 69/0059* (2013.01); *A63B 71/0054* (2013.01); *F16B 7/105* (2013.01); *G09B 19/0038* (2013.01); *A63B 2023/0411* (2013.01); *A63B 2071/0072* (2013.01); *A63B 2208/0204* (2013.01); *A63B 2209/02* (2013.01); *A63B 2209/10* (2013.01); *A63B 2225/093* (2013.01)

(58) Field of Classification Search
CPC ............ A63B 21/4005; A63B 21/4007; A63B 21/4009; A63B 21/4023; A63B 21/4025; A63B 21/4039; A63B 23/02; A63B 23/0205; A63B 23/0216; A63B 23/0233; A63B 23/0238; A63B 23/0244; A63B 23/025; A63B 23/04; A63B 23/0405; A63B 23/0482; A63B 23/0494; A63B 23/18; A63B 2023/0411; A63B 26/00; A63B 26/003; A63B 69/0057; A63B 69/0059; A63B 69/3608; A63B 71/0054; A63B 2071/0072; A63B 2208/02; A63B 2208/0204; A63B 2208/0223; A63B 2209/00; A63B 2209/02; A63B 2209/10; A63B 2210/50; A63B 2210/58; A63B 2225/09; A63B 2225/093; A63B 2244/09
See application file for complete search history.

(56) References Cited

U.S. PATENT DOCUMENTS

| | | | | | |
|---|---|---|---|---|---|
| 3,346,257 | A | * | 10/1967 | Whitney | A63B 69/0059 434/252 |
| 3,620,211 | A | * | 11/1971 | Goodell | A61F 5/05883 602/18 |
| 3,820,794 | A | * | 6/1974 | Inoue | A63B 69/3608 473/215 |
| 4,259,950 | A | * | 4/1981 | Klippel | A61F 5/055 128/870 |
| 4,714,247 | A | * | 12/1987 | Gerstung | A63B 69/00 482/105 |
| 4,948,122 | A | * | 8/1990 | Andrews, Sr. | A63B 21/065 482/105 |
| 5,086,757 | A | * | 2/1992 | Lestini | A61F 5/055 602/17 |
| 5,199,940 | A | * | 4/1993 | Morris | A61F 5/055 128/845 |
| 5,435,563 | A | * | 7/1995 | Salvatore | A63B 69/0059 128/870 |
| 5,685,831 | A | * | 11/1997 | Floyd | A61F 5/026 2/45 |
| 5,868,691 | A | * | 2/1999 | Vishnevsky | A61F 5/026 128/845 |
| 6,719,640 | B1 | * | 4/2004 | Madole | A61F 5/026 473/215 |
| 7,086,958 | B2 | * | 8/2006 | Eigiro | A63B 69/0059 434/252 |
| 8,708,834 | B1 | * | 4/2014 | Domangue | A63B 69/3608 473/207 |
| 8,852,014 | B1 | * | 10/2014 | Hoang | A63B 69/3608 473/208 |
| 9,061,173 | B1 | * | 6/2015 | Felkel | A63B 21/0557 |
| 9,295,896 | B1 | * | 3/2016 | Hoang | A63B 69/3614 |
| 2004/0116261 | A1 | * | 6/2004 | Saad | A63B 21/00 482/140 |
| 2010/0222716 | A1 | * | 9/2010 | Olsen | A61H 3/008 601/26 |
| 2010/0292051 | A1 | * | 11/2010 | Benumof | A61H 1/0296 482/10 |
| 2011/0009248 | A1 | * | 1/2011 | Bronston | A63B 21/02 482/124 |
| 2011/0275490 | A1 | * | 11/2011 | Sener | A63B 25/00 482/75 |
| 2012/0015777 | A1 | * | 1/2012 | Goel | A63B 21/4049 482/4 |
| 2013/0201021 | A1 | * | 8/2013 | Limonadi | A61B 5/6831 340/573.7 |
| 2013/0333097 | A1 | * | 12/2013 | Cranke | A63B 21/0557 2/300 |

* cited by examiner

SPINAL HARNESS APPARATUS AND METHOD FOR CONDUCTING ACTIVITIES REQUIRING A NEUTRAL SPINAL POSITION AND SPINAL RIGIDITY

CROSS-REFERENCE TO RELATED APPLICATION

This application is a continuation of U.S. patent application Ser. No. 15/082,132, filed on Mar. 28, 2016, which claims the benefits of, and the priority under 35 USC § 120 from U.S. patent application Ser. No. 15/082,132, filed Mar. 28, 2016, which is incorporated by reference herein in its entirety.

BACKGROUND OF THE INVENTION

1.) Field of the Invention

This invention relates to a harness apparatus. More specifically, a spinal harness apparatus for providing neuromuscular reeducation by encouraging a neutral spinal position and spinal rigidity during activities to prevent injury and improve performance after use of said apparatus.

2.) Description of the Prior Art Including Information Disclosed Under 37 CFR 1.97 and 37 CFR 1.98

A neutral spinal position consists of a proper degree of cervical, thoracic, and lumbar curvature. A typical approach to teach an individual neutral spinal positioning is for a trainer, therapist, or doctor to hold a linear and planar surface, such as a dowel rod, against the individual's back throughout the movement of the activity. The linear and planar surface creates a series of contact points that align the spine in a neutral position, thus providing the individual with a sense of orientation that represents a neutral spine. These linear and planar contact points are a hallmark characteristic of this method. While this may be effective, two people are required because someone is needed to hold a surface to the individual's back. What's more is that the practitioner holding the surface against the individual's back is left occupied and less able to focus on other important cues that encourage proper activity technique for the individual. In addition, this technique only partially trains the individual the required spinal rigidity for activities such as, but not limited to, the squat and deadlift. To maintain proper spinal rigidity during such activities, an individual must also learn the skill of diaphragmatic respiration. By doing so, an individual also learns the skill of "abdominal bracing" which is essential for maintaining spinal rigidity.

Although there is existing knowledge of technology that can be loosely construed to advocate spinal neutrality and rigidity, none of which clearly address the aforementioned necessities.

U.S. Pat. No. 8,708,834 issued Apr. 29, 2014, by Elizabeth Domangue for Golf Posture and Swing Training Harness discloses a training harness suitable to train a golfer proper golfing posture and golf swing. The harness consists of a body harness equipped with a channel in which a rigid shaft may be inserted. The harness may also include a scapula bar slot that runs perpendicular to the shaft channel in which a scapula bar may be inserted. This harness is insufficient for use in the context of activities such as, but not limited to, resistance training for three reasons. Firstly, the rigid shaft is illustrated as being tapered from the proximal end to the distal end so that the shaft may fit into the channel securely. This violates the linear and planar contact point characteristic that is required to maintain a neutral spinal position. Because the shaft is less in diameter at the distal end, the wearer may have to over-extend the lumbar spine to make contact with the shaft. Secondly, the placement of said scapula bar may further disrupt the required linear and planar contact point characteristic to maintain a neutral spine which may also lead to incorrect spinal positioning. Lastly, there is no proposed mechanism to encourage abdominal bracing which is a paramount feature of spinal rigidity when engaged in activities that demand maximal structural integrity of the spine.

U.S. Pat. No. 6,719,640 issued Apr. 13, 2004, by Darrin E. Madole for Posture Training Device and Methods for Using Same discloses a posture training device for improving the posture of a user when the user is engaged in certain activities, such as swinging a golf club. The device comprises of an elongated rigid member and rigid element covered in a fabric, preferably a padded foam, having a securement element extending therefrom. There may also be shafts for which the securement elements can be attached to. The device calls for at least one pair of securement elements to be secured to the user. Although this device and method may be adequate in the context of golf, it is inadequate for use in the context of other activities for a multitude of reasons. Firstly, the linear and planar contact point characteristic that is required to maintain a neutral spinal position is violated. Although it is described that the back of the user's head is to make contact with a sufficiently planar rigid member, the user's upper back and lower back will make contact with the rigid element, shafts, and fabric cover which hold the securement elements to the rigid member thereby disrupting the linear and planar characteristic of the contact point series. A second violation of the linear and planar contact point characteristic is that the described rigid member is broad which would result in lifting away of the rigid member due to making excessive contact with paraspinal musculature. Thirdly, the proposed means by which the securement elements are secured to the user would make it difficult for a user to don the device without the assistance of another person. The length and weight of the device would make it difficult to keep in the appropriate place while the user attempts to fasten the securement elements in front of themselves. Additionally, the device and method was designed to allow for rotation during activity which may be appropriate for golfing, but not in the least for activities such as the squat and deadlift. Lastly, there is no proposed mechanism to encourage abdominal bracing which is a crucial feature of spinal rigidity when engaged in activities that demand maximal structural integrity of the spine.

It is also important to distinguish contact at the external occipital protuberance from mere contact with the back of the head as both of the aforementioned inventions fail to specify. If the individual is making contact with the rigid member using their external occipital protuberance, cervical neutrality is ensured. However, if the individual is only to make contact using any part of the back of their head, cervical neutrality is unlikely as it is easy to over-extend the cervical spine to make contact between the rigid member and the back of the head.

Other devices such as U.S. Pat. No. 5,199,940, U.S. Pat. No. 5,685,831, and U.S. Pat. No. 5,868,961 involve some degree of strapping and a rigid member to influence posture. These devices also include a means for strapping the head of the user directly to the rigid member. This is problematic in the context of activities such as the squat because one variation of the squat involves placing a barbell on the user's upper back and if the head is strapped to the rigid member, the user would not be able to position the barbell in said location. These devices, like the aforesaid devices, also lack a means by which to influence the user's breathing to encourage spinal rigidity.

Other devices are known to influence a user to breathe diaphragmatically. Such devices include U.S. Pat. No. 1,074,846, U.S. Pat. No. 4,506,883, U.S. App. No. 2009138358, and U.S. App. No. 20110230311. However, these devices provide little to no means to influence spinal position. Therefore, what is called for is an apparatus and associated method specifically designed for activities that require a neutral spinal position and spinal rigidity. Said apparatus should maintain a true linear and planar contact point characteristic, involve a degree of respiratory modification, be easily donned and transported, be comfortable to wear, and be effectively utilized during activities that demand maximal structural integrity of the spine. Said apparatus should provide neuromuscular reeducation by introducing quality movement and positioning to an individual with the intent to retain quality movement and positioning in absence of said apparatus after use.

BRIEF SUMMARY OF THE INVENTION

The present invention is a solution to the preceding limitations and inadequacies as made evident by the description of prior art by delivering the called for apparatus.

Exercise programs may consist of a variety of activities that require a neutral spinal position and spinal rigidity including, but not limited to, the squat and the deadlift. Engaging in such activities is well-known to increase performance via adaptations made by muscular and neurological tissues. These adaptations may contribute to profound improvements in an individual's health status. However, if the activities are performed in absence of proper form and execution, these activities may have a greater probability of causing injury.

During activities such as the squat and the deadlift, the spine and associated musculature act to transmit power generated by hip musculature to the opposing force that which the individual is attempting to move. To transmit this power effectively and safely, the spine must be in a neutral position and be effectively rigid throughout the movement in order to maintain maximal structural integrity of the spine. During such activity, movement at the head of the femur must be independent from lumbo-pelvic movement at the hip joint. When this is accomplished, it known as "hip hinging." Hip hinging can only be accomplished by maintaining a neutral spinal position and spinal rigidity. Consequently, when movement at the head of the femur and the lumbo-pelvic complex are coupled, spinal neutrality and rigidity are compromised and the spine is exposed to increased shear force which can lead to injury and decreased performance. Accordingly, in order to perform such activities safely and effectively, the individual must maintain a neutral spinal position and maintain adequate spinal rigidity throughout the movement of the activity.

A linear contact surface is aligned in a straight line. A planar contact surface relates to a particular two-dimensional plane. Utilizing a contact surface that is furnished by a cylindrical rigid member is an effective way to establish a contact surface that is both linear and planar. As anterolateral surfaces of the cylindrical rigid member converge toward the anterior surface, a linear contact surface is provided longitudinally along the anterior surface of the rigid member. The contact surface would also be planar as the contact surface would be positioned in a single two-dimensional plane wherein the plane would be tangent to the anterior surface of the rigid member. As discussed in the description of the prior art, several factors can disrupt the linear and planar contact surface characteristic. One such factor would be permitting fabric to serve as a contact surface. A contact surface provided by fabric would be positioned in a different two-dimensional plane than the contact surface provided by the rigid member. Fabric, such as padding, may deform relative to the amount of pressure exerted upon its surface which would also result in various planes of contact throughout the contact surface as the user wears the apparatus. Also discussed in the description of the prior art, another disruption of the linear and planar contact surface characteristic would be implementing a rigid member that is tapered wherein the various widths of the rigid member would place the contact surface of the rigid member in various two-dimensional planes.

The present invention ensures a neutral spinal position by providing a rigid member with an effectively linear and planar surface that makes contact with the dorsum of an individual. The linear and planar surface of the rigid member makes contact at the approximate levels of the external occipital protuberance, spinous processes of the mid-thoracic spine, and the median sacral crest. The surface is to maintain contact with these points throughout the process of the activity. If the individual expresses too much cervical extension, contact may be lost between the rigid member surface and the mid-thoracic spine. If the individual expresses too much cervical flexion, contact may be lost between the rigid member surface and the external occipital protuberance. If the individual expresses too much thoracic flexion, contact may be lost between the rigid member surface and the external occipital protuberance. If the individual expresses too much thoracic extension, contact may be lost between the rigid member surface and the thoracic spine. If the individual expresses too much lumbar extension, contact may be lost between the rigid member surface and the thoracic spine. If the individual expresses too much lumbar flexion, contact may be lost between the rigid member surface and the median sacral crest.

The rigid member may be tubular and singular or consist of an inner and outer component that make the total length of the rigid member telescopically adjustable to an infinite number of lengths within the parameters of the inner component. It is important that the series of contact points along the rigid member maintain a linear and planar characteristic. In regard to the telescopically adjustable embodiment, it is accomplished by splitting the outer component into a superior and inferior portion. The superior portion of the outer component is to make contact with the individual at the approximate level of the external occipital protuberance where the inferior portion of the outer component makes contact with the individual at the approximate levels of the spinous processes of the mid-thoracic vertebrae and median sacral crest. The superior portion of the outer component is to be permanently bound to the inner component. The inner component may be free to slide within the inferior portion of the outer component. The inner component may be marked with a graduating series of symbols wherein each symbol corresponds with a particular total length of the rigid member. The inferior portion of the outer component may contain a pair of holes on opposing sides that may be positioned to be congruent with a plurality of holes in the inner component. The holes of the inner component and inferior portion of the outer component may be corresponded with each other at various positions and joined by a coupler pin effectively making the total length of the rigid member adjustable. In another embodiment, the inner component may be joined with the inferior portion of the outer component by means of a built-in or external adjustable mechanism. In a similar fashion, the total length of the rigid member may be telescopically adjusted to an infinite number of lengths within the parameters of the inner component. In yet another embodiment, the inner component may be joined with the inferior portion of the outer component by means of a spring-loaded push button. The push button may be installed within the inner component where it may extend beyond the inner component through a hole. This hole may be made to correspond with a plurality of holes at various increments along the inferior portion of the outer component through which the push button may also extend effectively making the rigid member adjustable lengthwise. Similarly, the spring loaded push button may be double-headed. In this instance, there are two buttons that would extend beyond the inner component of the rigid member through push button holes on opposing sides. These holes may be made to correspond with a plurality of holes at various increments along the inferior portion of the outer component through which the push buttons may also extend effectively making the rigid member adjustable lengthwise.

To maintain proper spinal rigidity, an individual must learn the skill of diaphragmatic respiration. By doing so, the individual increases intra-abdominal pressure and, when braced against the abdominal wall musculature, increases spinal rigidity and structural integrity. In order to breathe diaphragmatically, one must learn to engage respiratory musculature such as the diaphragm, pelvic floor musculature, and abdominal wall musculature while minimizing the use of respiratory musculature that influence movement of the ribcage. As mentioned above, this is known as abdominal bracing and is an essential feature to achieving spinal rigidity.

The present invention promotes spinal rigidity via respiratory modification enforced by the strapping system. The strapping system may consist of an adjustable belt and suspenders that may be affixed to the rigid member in an infinite number of ways and worn about an individual's torso. The belt portion is preferably, but not limited to, non-elastic in nature to modulate chest expansion during inspiration. This modulation of chest expansion discourages use of musculature associated with chest breathing and encourages use of musculature associated with diaphragmatic respiration. This strapping system also makes the apparatus easy to don and eliminates the need for assistance from another individual to put on. The suspenders may be equipped with shoulder padding. The terminal ends of the suspenders are joined with the anterior and posterior aspects of the belt. All lengths of the suspenders may be adjustable. The suspenders may be joined with the rigid member by a variety of means. One such means may be built-in slots within the rigid member that the suspenders transverse. Another means may be binding the suspenders to the rigid member with a strip of fabric attached to the suspenders that loops around the rigid member. The belt may also be joined with the rigid member by a variety of means. One such means may be built in slots within the rigid member through which the belt may transverse. Another means may be that the belt circumvents the posterior aspect of the rigid member and is held in place by a bracket that may be affixed to the rigid member at various positions.

In another feature of the invention, there is disclosed a method for conducting activities that require a neutral spinal position and spinal rigidity with the intent of neuromuscular reeducation. These activities may include, but are not limited to, the squat and the deadlift. While engaged in activity, an individual shall be equipped with the invention. The rigid member will make contact at the approximate levels of the individual's external occipital protuberance, spinous processes of the mid-thoracic vertebrae, and the median sacral crest. The individual is to maintain these points of contact throughout the process of the activity. In addition, the individual will engage in diaphragmatic breathing and abdominal bracing as cued by the strapping system that is worn about the individual's torso. The individual is to train with the present invention sufficiently so that when they engage in said activities in absence of the invention, spinal neutrality and rigidity are more likely to be preserved by means of neuromuscular reeducation.

In another application of the inventive spinal harness apparatus, the rigid member may make contact with ventral aspect of a user's body at the approximate levels of the pubic symphysis, the xiphoid process, and the nose. This is an appropriate application for a user who exhibits a large degree of lumbar extension or anterior pelvic tilt. In this application, a belt portion of the strapping system may be disposed about a user's waist. The suspender portion of the strapping system may be forgone in this application to allow the inclination of the rigid member to match the inclination of the user's pelvic tilt. By utilizing this application, such user will be encouraged to maintain contact with the rigid member at the appropriate levels during activities that require a neutral spinal position and spinal rigidity. If a user exhibits too much anterior pelvic tilt or lumbar extension, the rigid member will lose contact with the user's xiphoid process and nose. This will encourage a user to exhibit less lumbar extension or anterior pelvic tilt thereby bringing the rigid member back into contact with the user at the appropriate levels.

BRIEF DESCRIPTION OF THE SEVERAL VIEWS OF THE DRAWING(S)

Figure 1:
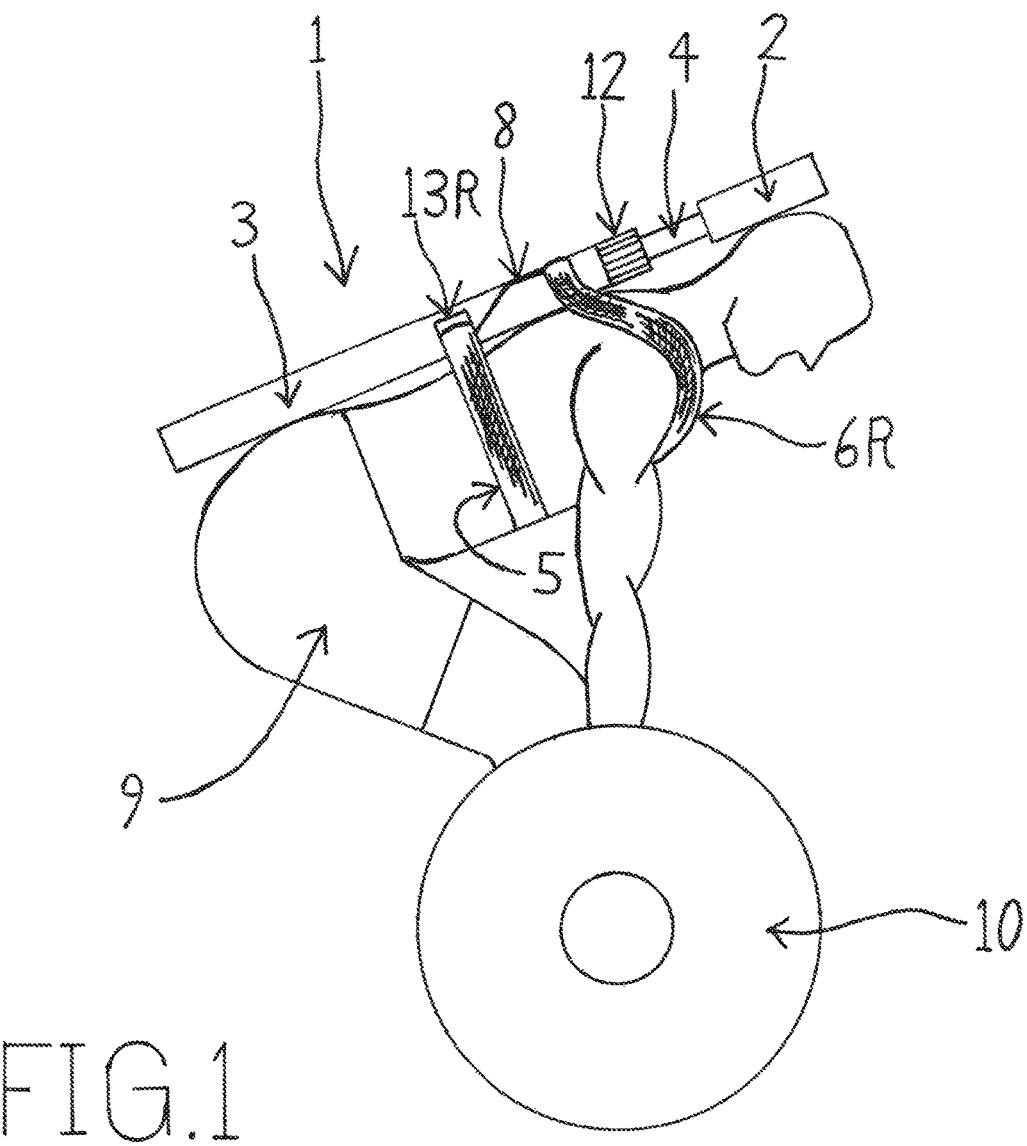
FIG. 1 is a right side view of a user wearing a spinal harness apparatus of the present invention.

LIST OF REFERENCE NUMERALS 1 rigid member
2 superior portion of the outer component of the rigid member
3 inferior portion of the outer component of the rigid member
4 inner component of the rigid member
5 belt portion of the strapping system 6 suspender portion of the strapping system
7 loop in suspender portion of the strapping system
8 posterior portion of the strapping system
9 user
10 weight
11 coupler pin
12 adjustable mechanism
13 belt slot in the rigid member
14 belt bracket
15 belt portion of the strapping system securement mechanism
16 adjustable component of the suspender portion of the strapping system
17 opposing coupler holes in inferior portion of the outer component of the rigid member
18 opposing coupler holes in the inner component of the rigid member
19 spring-loaded push button
20 push button hole in inferior portion of the outer component of the rigid member
21 push button hole in inner component of the rigid member
22 graduated series of symbols DETAILED DESCRIPTION OF THE INVENTION AS REQUIRED BY 37 CFR 1.71 AND MPEP § 608.01

Figure 2:
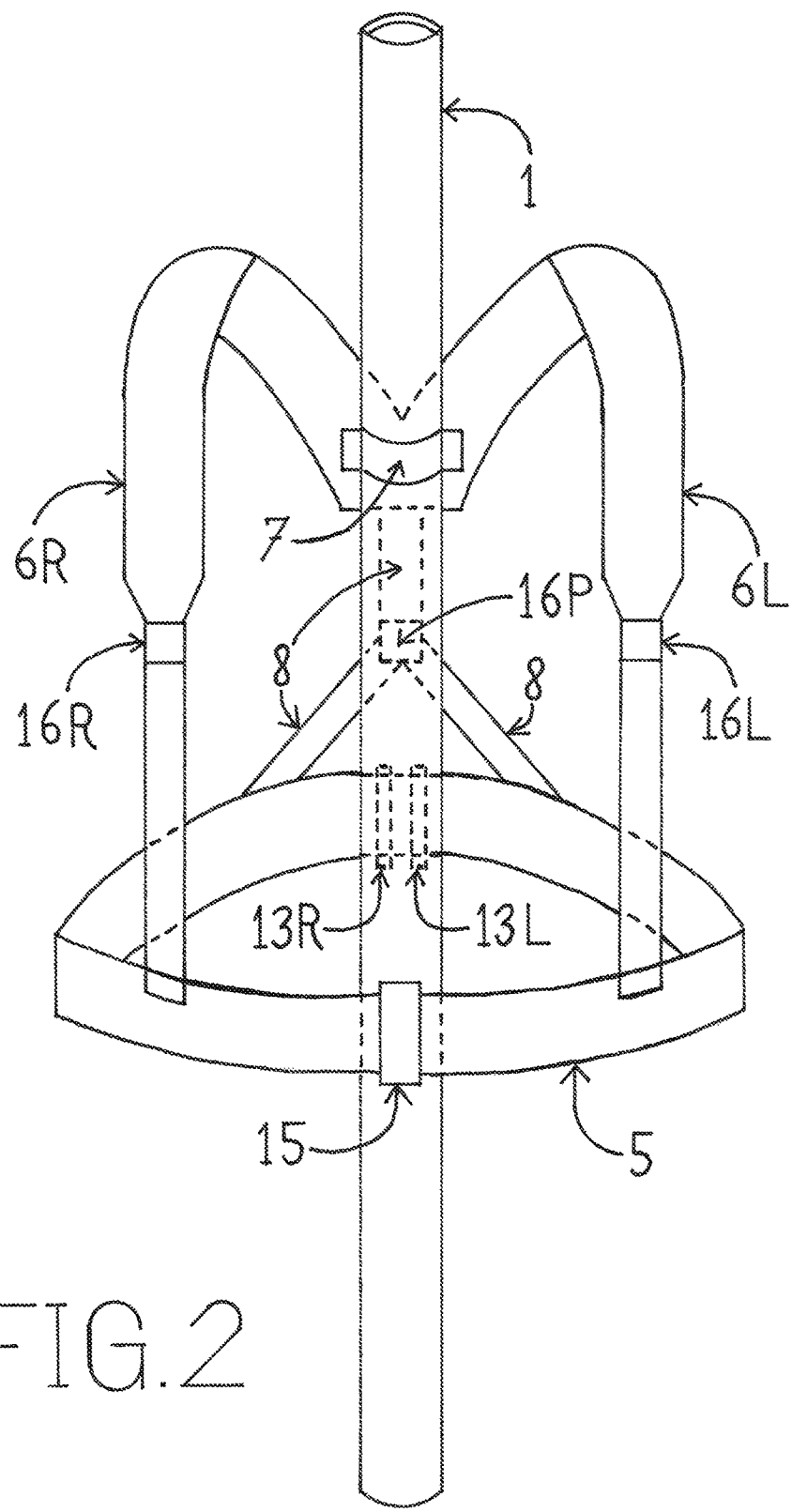
FIG. 2 is a plan frontal view of a first embodiment of the rigid member and the strapping system of the present invention.

Referring now more particularly to the drawings, there is shown in FIG. 2 a plan frontal view of a first embodiment of the rigid member 1 and the strapping system of the present invention. It comprises a rigid member 1 with belt slots in the rigid member 13 (a right belt slot 13R and a left belt slot 13L), a strapping system including a suspender portion 6 (a right suspender portion 6R and a left suspender portion 6L), a loop in the suspender portion of the strapping system 7, an adjustable component of the suspender portion of the strapping system 16 (a right adjustable component 16R for the right suspender portion 6R, a left adjustable component 16L for the left suspender portion 6L, and an adjustable component 16P for the posterior portion of the strapping system 8), a belt portion of the strapping system 5, and a belt portion of the strapping system securement mechanism 15. The rigid member 1 is shown as being singular, linear, and planar. The rigid member 1 may be preferentially, but not limited to, a cylindrical shape to minimize the surface area of the linear and planar contact points along the anterior surface of the rigid member 1. The total length of this first embodiment of the rigid member 1 is sufficient in length such that it accommodates users of varying sizes from the very tall to the very short. The rigid member 1 may be made of any material that is sufficiently rigid such as, but not limited to, plastic and metal. It is noted that while the rigid member 1 illustrated in FIG. 2 is as such, any other embodiment by which a rigid member 1 maintains the necessary contact points along the dorsum of the user to accomplish the desired effects of the invention described herein is suitable. The suspender portion of the strapping system 6 may be padded by foam and made of appropriate material such as, but not limited to, polyester, nylon, canvas, or leather. The suspender portion of the strapping system 6 may be infinitely adjustable within the parameters of the suspender material by the means of the adjustable component of the suspender portion of the strapping system 16 which may be comprised of a buckle, hook and loop fasteners (commercially available under the trademark VELCRO), or other equivalent known fastener means. The terminal ends of the suspender portion of the strapping system 6 may be fastened by glue, heat fusion, sewn, or any other known fastening means to the belt portion of the strapping system 5 anteriorly by extensions of the suspender portion of the strapping system 6 and posteriorly by a posterior portion of the strapping system 8. A loop in the suspender portion of the strapping system 7 is provided for securement of the rigid member 1 to the suspender portion of the strapping system 6. Securement of the rigid member 1 to the suspender portion of the strapping system 6 by the loop in the suspender portion of the strapping system 7 may be achieved by free passage of the rigid member 1 through the loop in the suspender portion of the strapping system 7 rendering the securement infinitely adjustable within the parameters of the rigid member 1. The belt portion of the strapping system 5 is shown as secured to the rigid member 1 by means of belt slots in the rigid member 13. It is noted that any other embodiment of securing the belt portion of the strapping system 5 to the rigid member 1 is suitable as long as the means does not interfere with the function of the inventive spinal harness apparatus described herein. The belt portion of the strapping system 5 may be made of material such as, but not limited to, polyester, nylon, canvas, or leather. The terminal ends of the belt portion of the strapping system 5 may be joined anteriorly by the means of a belt portion of the strapping system securement mechanism 15 which may be comprised of a buckle, hook and loop fastener (commercially available under the trademark VELCRO), or other equivalent known securement means.

Figure 8:
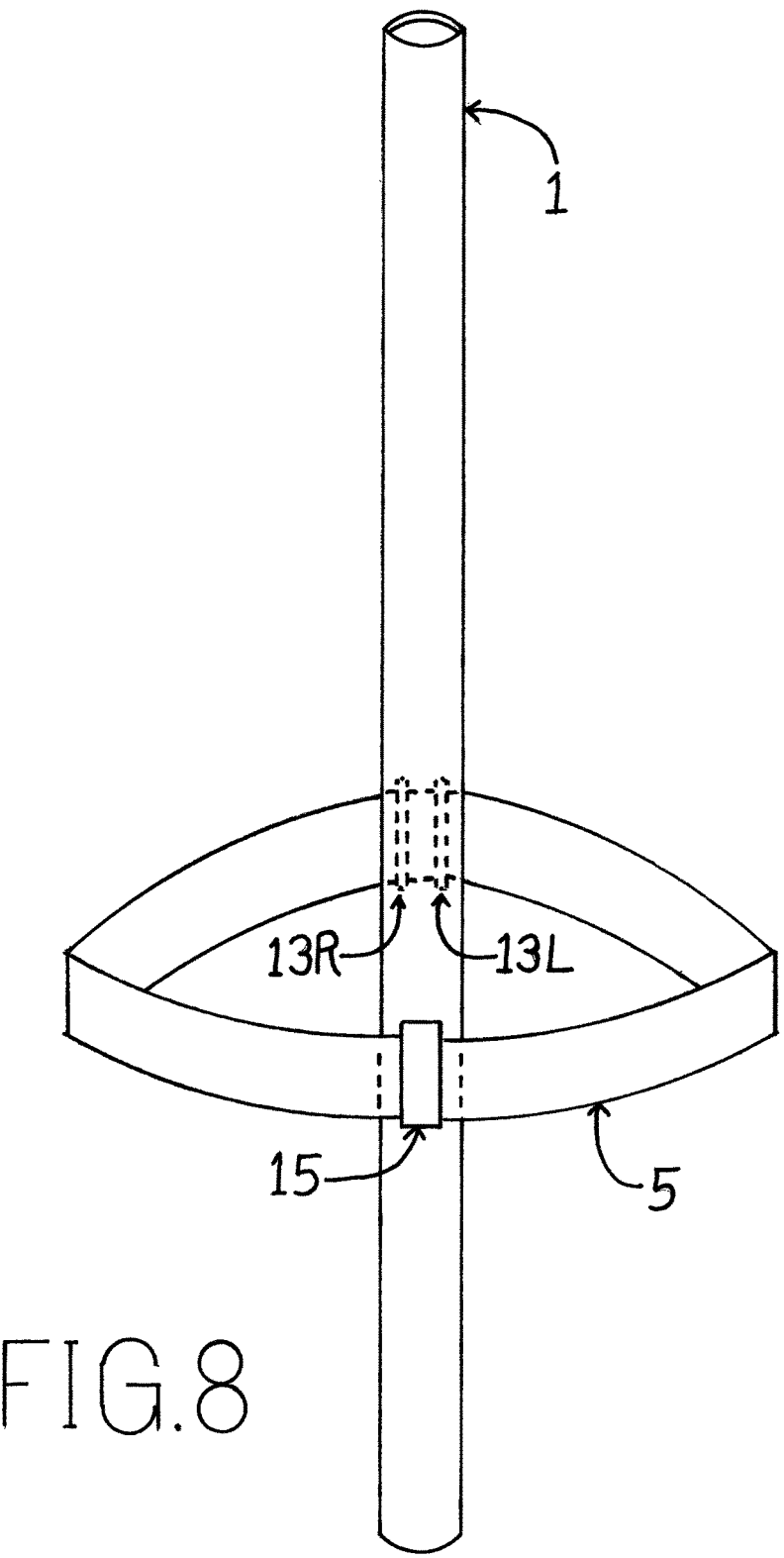
FIG. 8 is a plan frontal view of the inventive spinal harness apparatus wherein the suspender portion of the strapping system has been forgone.

There is shown in FIG. 8 a plan frontal view of the inventive spinal harness apparatus wherein the suspender portion of the strapping system 6 has been forgone. The apparatus as shown in FIG. 8 is similar to the apparatus as shown in FIG. 2 except that the suspender portion of the strapping system 6 has been forgone. It comprises a rigid member 1 with belt slots in the rigid member 13 (a right belt slot 13R and a left belt slot 13L), a strapping system including a belt portion of the strapping system 5 and a belt portion of the strapping system securement mechanism 15. In addition to the application of the rigid member 1 making contact with the dorsum of the user, another application of the inventive spinal harness apparatus includes the rigid member 1 making contact with a ventral aspect of a user's body at the approximate levels of the pubic symphysis, the xiphoid process, and the nose (not shown). This is an appropriate application for a user who exhibits a large degree of lumbar extension or anterior pelvic tilt. In this application, a belt portion of the strapping system 5 may be disposed about a user's waist. The suspender portion of the strapping system 6 may be forgone in this application to allow the inclination of the rigid member to match the inclination of the user's pelvic tilt. By utilizing this application, such user will be encouraged to maintain contact with the rigid member 1 at the appropriate levels during activities that require a neutral spinal position and spinal rigidity. If a user exhibits too much anterior pelvic tilt or lumbar extension, the rigid member 1 will lose contact with the user's xiphoid process and nose. This will encourage a user to exhibit less lumbar extension or anterior pelvic tilt thereby bringing the rigid member 1 back into contact with the user at the appropriate levels.

Figure 3:
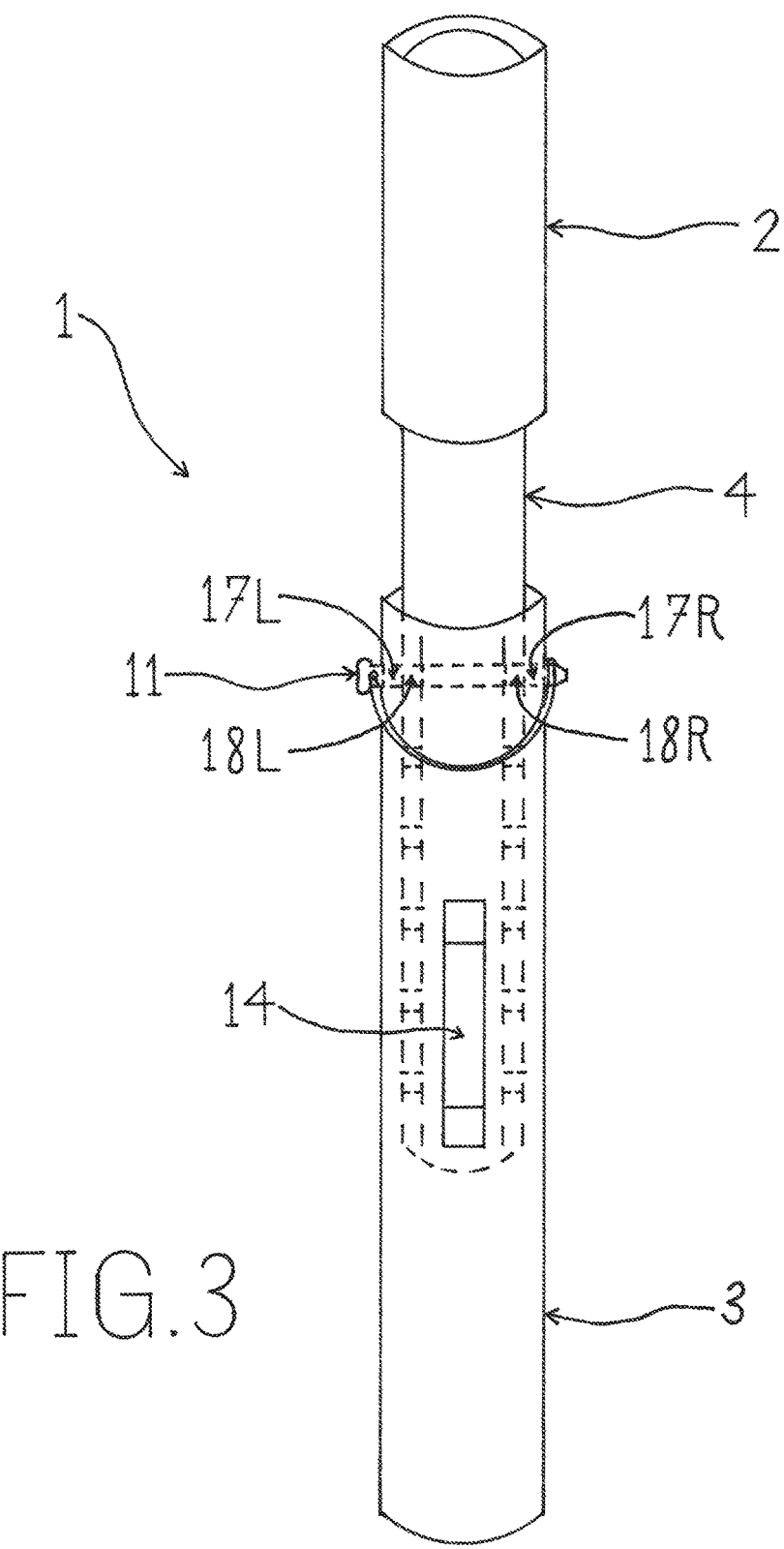
FIG. 3 is a plan frontal view of the posterior surface of a second embodiment of the rigid member.

There is shown in FIG. 3 a plan frontal view of the posterior surface of a second embodiment of the rigid member 1. It is comprised of a superior portion of the outer component of the rigid member 2, an inferior portion of the outer component of the rigid member 3, an inner component of the rigid member 4, a coupler pin 11, coupler holes in the inferior portion of the outer component of the rigid member 17 (right coupler holes 17R and left coupler holes 17L), coupler holes in the inner component of the rigid member 18 (right coupler holes 18R and left coupler holes 18L), and a belt bracket 14. The components of the rigid member 1 may be preferentially, but not limited to, a cylindrical shape to minimize the surface area of the linear and planar contact points along the anterior surface of the rigid member 1. The primary difference between the rigid member 1 shown in FIG. 2 and the rigid member 1 shown in FIG. 3 is that the total length of the rigid member 1 illustrated in FIG. 3 is telescopically adjustable. The superior portion of the outer component of the rigid member 2, the inner component of the rigid member 4, and the inferior portion of the outer component of the rigid member 3 may be made of similar plastic or metallic material as described for the first embodiment of the rigid member 1. The diameters of the superior portion of the outer component of the rigid member 2 and the inferior portion of the outer component of the rigid member 3 are to be slightly greater than the diameter of the inner component of the rigid member 4 such that the inner component of the rigid member 4 may be fitted inside the superior portion of the outer component of the rigid member 2 and the inferior portion of the outer component of the rigid member 3. The superior portion of the outer component of the rigid member 2 is preferably bonded permanently to the inner component of the rigid member 4 by the means of cement, glue, weld, or other equivalent known bonding means. The inner component of the rigid member 4 may be inserted into the inferior portion of the outer component of the rigid member 3 such that these members become telescopically adjustable within one another. There may be a set of opposing coupler holes in the inferior portion of the outer component of the rigid member 17 that may correspond with a plurality of opposing coupler holes in the inner component of the rigid member 18. When the set of opposing coupler holes in the inferior portion of the outer component of the rigid member 17 are aligned with any of the plurality of opposing coupler holes in the inner component of the rigid member 18, a coupler pin 11 may be inserted and secured through these holes thereby securing the inferior portion of the outer component of the rigid member 3 to the inner component of the rigid member 4. By doing so, this securement makes the total length of the rigid member 1 selectable depending on which of the plurality of opposing coupler holes in the inner component of the rigid member 18 are corresponded with the opposing coupler holes in the inferior portion of the outer component of the rigid member 17. It is noted that because the diameter of the superior portion of the outer component of the rigid member 2 is identical to the diameter of the inferior portion of the outer component of the rigid member 3, the linear and planar contact point characteristic is maintained along the anterior surface of the rigid member 1. A belt bracket 14 is shown affixed to the posterior aspect of the inferior portion of the outer component of the rigid member 3. The belt bracket 14 may have a similar construct to that of a standard door handle thereby creating a passage between the belt bracket 14 and the inferior portion of the outer component of the rigid member 3 through which a belt may pass. It is noted that although this is one embodiment of securing a belt portion of the strapping system 5 to the rigid member 1, any means of securing a belt to a rigid member is acceptable as long it does not interfere with the function of the inventive spinal harness apparatus described herein. It is also noted that a detailed view of this belt securement is shown in FIG. 7 and an additional embodiment of affixing a belt to a rigid member is shown in FIG. 6.

Figure 4:
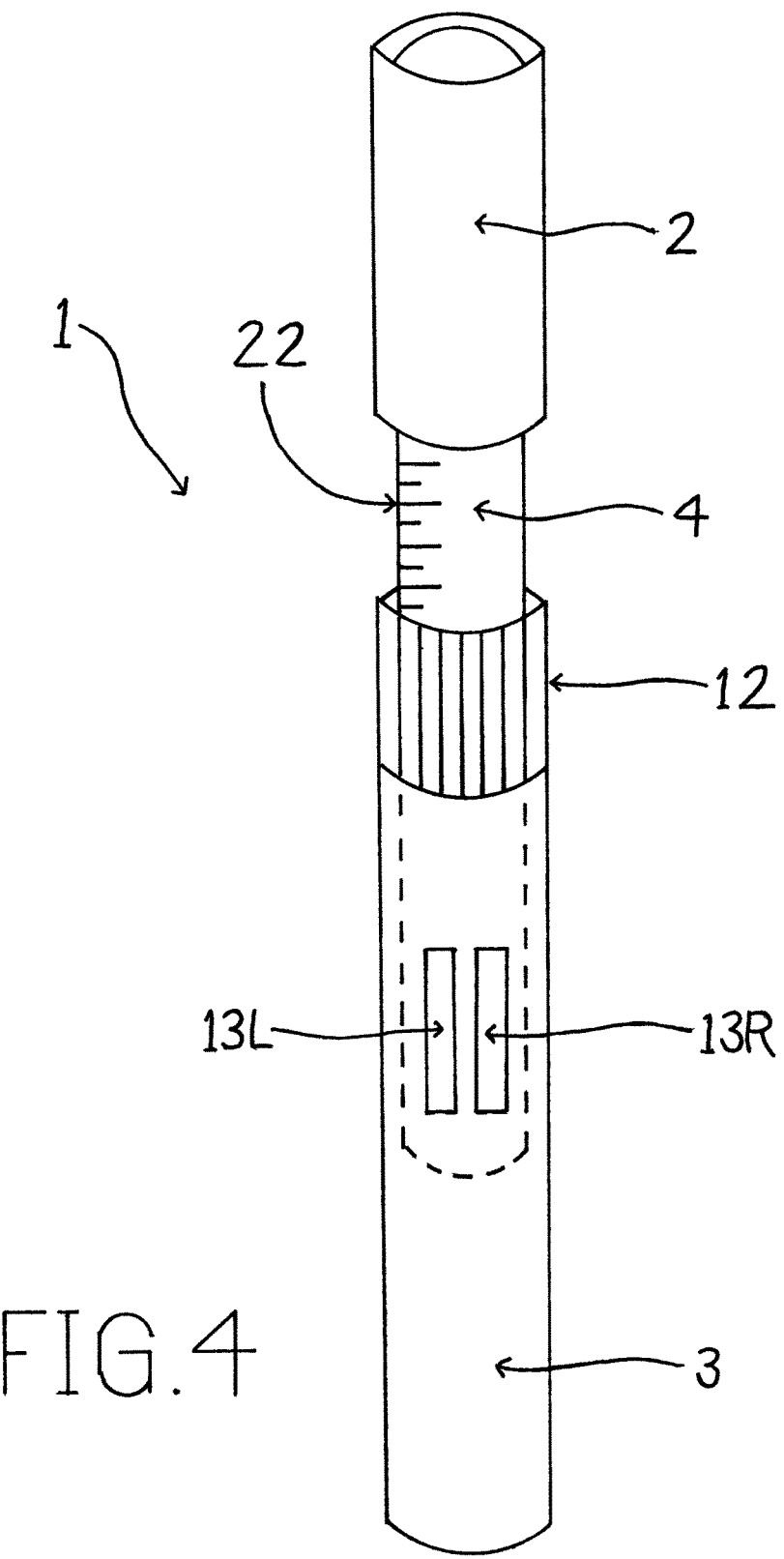
FIG. 4 is a plan frontal view of the posterior surface of a third embodiment of the rigid member.

There is shown in FIG. 4 a plan frontal view of the posterior surface of a third embodiment of the rigid member 1. It is comprised of a superior portion of the outer component of the rigid member 2, an inferior portion of the outer component of the rigid member 3, an inner component of the rigid member 4, a graduated series of symbols 22, an adjustable mechanism 12, and a pair of belt slots in the rigid member 13 (right belt slot 13R and left belt slot 13L). The components of the rigid member 1 may be preferentially, but not limited to, a cylindrical shape to minimize the surface area of the linear and planar contact points along the anterior surface of the rigid member 1. The primary difference between the rigid member 1 shown in FIG. 2 and the rigid member 1 shown in FIG. 4 is that the total length of the rigid member 1 illustrated in FIG. 4 is telescopically adjustable to an infinite number of lengths within the parameters of the inner component of the rigid member 4. The primary difference between the rigid member 1 shown in FIG. 3 and the rigid member 1 shown in FIG. 4 is the manner in which the rigid member 1 is modulated lengthwise wherein the rigid member 1 in FIG. 4 utilizes an adjustable mechanism 12 to secure the inferior portion of the outer component of the rigid member 3 to the inner component of the rigid member 4. The superior portion of the outer component of the rigid member 2, the inner component of the rigid member 4, and the inferior portion of the outer component of the rigid member 3 may be made of similar plastic or metallic material as described for the first and second embodiments of the rigid member 1. The diameters of the superior portion of the outer component of the rigid member 2 and the inferior portion of the outer component of the rigid member 3 are to be slightly greater than the diameter of the inner component of the rigid member 4 such that the inner component of the rigid member 4 may be fitted inside the superior portion of the outer component of the rigid member 2 and the inferior portion of the outer component of the rigid member 3. The superior portion of the outer component of the rigid member 2 is preferably bonded permanently to the inner component of the rigid member 4 by the means of cement, glue, weld, or other equivalent known bonding means. The inner component of the rigid member 4 may be inserted into the inferior portion of the outer component of the rigid member 3 such that these members become telescopically adjustable within one another to an infinite number of lengths within the parameters of the inner component of the rigid member 4. There may be an adjustable mechanism 12 built into, or external to, the inferior portion of the outer component of the rigid member 3. This adjustable mechanism 12 may be "twist and lock" in nature, a threaded wingnut through a threaded hole, or other equivalent known adjusting means. The total length of the rigid member 1 may be selectable by sliding the inner component of the rigid member 4 within the inferior portion of the outer component of the rigid member 3 to a desired position and engaging the adjustable mechanism 12 to secure the components in the desired position. While a user is selecting a total length of the rigid member 1, a user may choose to reference a graduated series of symbols 22 wherein each symbol corresponds with a particular total length of the rigid member 1. It is noted that because the diameter of the superior portion of the outer component of the rigid member 2 is identical to the diameter of the inferior portion of the outer component of the rigid member 3, the linear and planar contact point characteristic is maintained along the anterior surface of the rigid member 1. As another embodiment of securing a belt to a rigid member, shown in FIG. 4 is a set of belt slots in the rigid member 13. The belt slots in the rigid member 13 create a passage through which a belt may pass through the rigid member 1 thereby securing a belt portion of the strapping system 5 to the rigid member 1. It is noted that although this is a second embodiment of securing a belt portion of the strapping system 5 to the rigid member 1, any means of securing a belt to a rigid member is acceptable as long it does not interfere with the function of the inventive spinal harness apparatus described herein. It is also noted that a detailed view of this second belt securement embodiment is shown in FIG. 6 and a first embodiment of affixing a belt to a rigid member is shown in FIG. 7.

Figure 5:
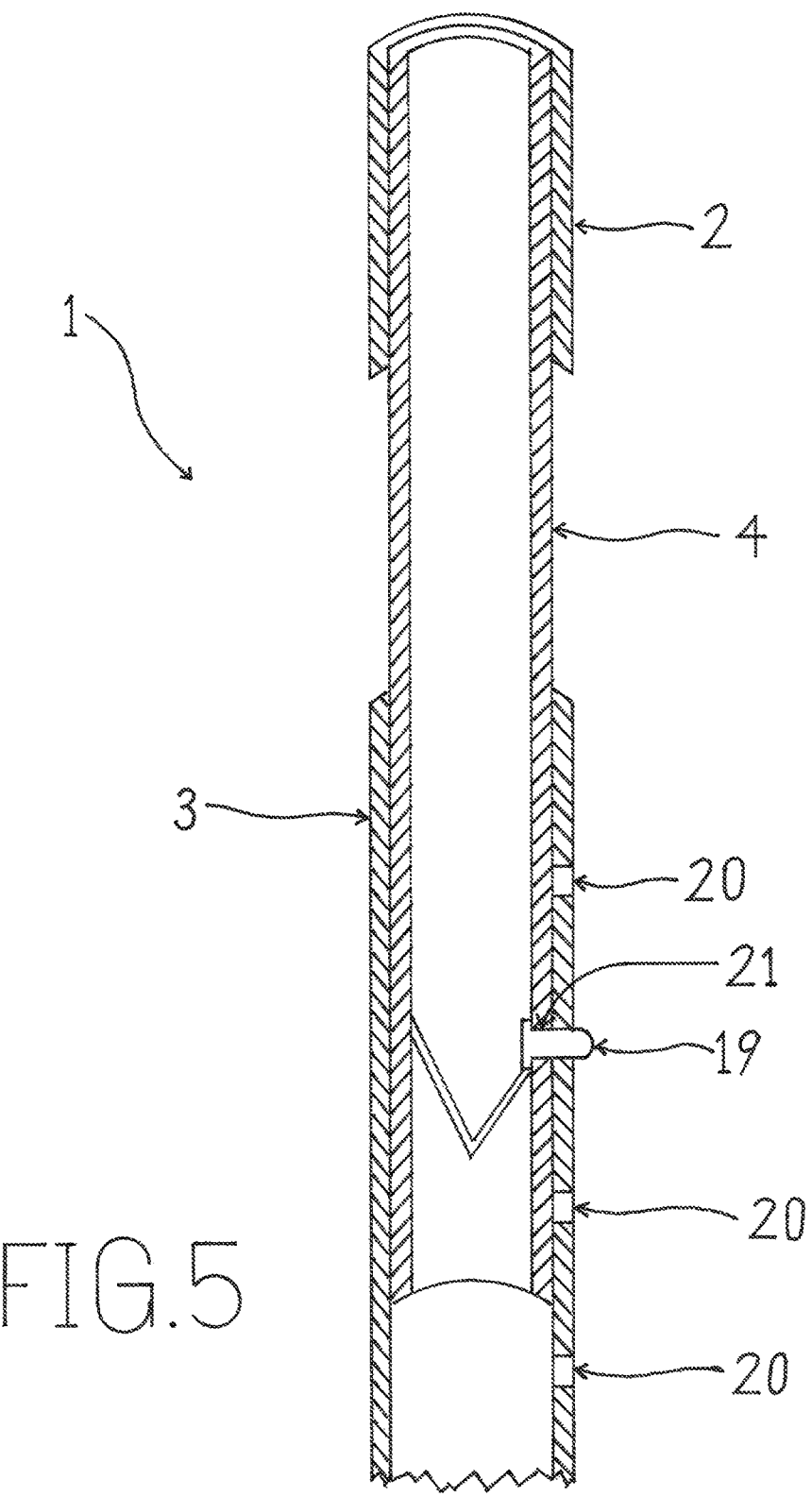
FIG. 5 is a cross-sectional view of the adjustable portion of a fourth embodiment of the rigid member.

There is shown in FIG. 5 a cross-sectional view of the adjustable portion of a fourth embodiment of the rigid member 1. It is comprised of a superior portion of the outer component of the rigid member 2, an inferior portion of the outer component of the rigid member 3, an inner component of the rigid member 4, a spring-loaded push button 19, a push button hole in the inner component of the rigid member 21, and a plurality of push button holes in the inferior portion of the outer component of the rigid member 20. The components of the rigid member 1 may be preferentially, but not limited to, a cylindrical shape to minimize the surface area of the linear and planar contact points along the anterior surface of the rigid member 1. The primary difference between the rigid member 1 shown in FIG. 2 and the adjustable portion of the rigid member 1 shown in FIG. 5 is that the total length of the rigid member 1 illustrated in FIG. 5 is telescopically adjustable. The primary difference between the rigid members 1 shown in FIG. 3 and FIG. 4 from the adjustable portion of the rigid member 1 shown in FIG. 5 is the manner in which the rigid member 1 is modulated lengthwise wherein the rigid member 1 in FIG. 5 utilizes a spring-loaded push button 19 to secure the inferior portion of the outer component of the rigid member 3 to the inner component of the rigid member 4. The spring-loaded push button 19 may be single-headed (shown in FIG. 5) or double-headed (not shown). The superior portion of the outer component of the rigid member 2, the inner component of the rigid member 4, and the inferior portion of the outer component of the rigid member 3 may be made of similar plastic or metallic material as described for the first, second, and third embodiments of the rigid member 1. The diameters of the superior portion of the outer component of the rigid member 2 and the inferior portion of the outer component of the rigid member 3 are to be slightly greater than the diameter of the inner component of the rigid member 4 such that the inner component of the rigid member 4 may be fitted inside the superior portion of the outer component of the rigid member 2 and the inferior portion of the outer component of the rigid member 3. The superior portion of the outer component of the rigid member 2 is preferably bonded permanently to the inner component of the rigid member 4 by the means of cement, glue, weld, or other equivalent known bonding means. The inner component of the rigid member 4 may be inserted into the inferior portion of the outer component of the rigid member 3 such that these members become telescopically adjustable within one another. There may be a spring-loaded push button 19 installed within the inner component of the rigid member 4 where it may extend beyond the inner component of the rigid member 4 through a push button hole in the inner component of the rigid member 21. This hole may be made to correspond with a plurality of push button holes in the inferior portion of the outer component of the rigid member 20. When the push button hole in the inner component of the rigid member 21 is aligned with a particular push button hole in the inferior portion of the outer component of the rigid member 20, the spring-loaded push button 19 may extend through both the inner component of the rigid member 4 and the inferior portion of the outer component of the rigid member 3 thereby securing these components in a particular orientation. This feature allows the total length of the rigid member 1 to be telescopically adjustable depending on which push button hole in the inferior portion of the outer component of the rigid member 20 is aligned with the push button hole in the inner component of the rigid member 21 through which a spring-loaded push button 19 may pass. To select a particular total length of the rigid member 1, the spring loaded push button 19 may be depressed such that it only passes through the inner component of the rigid member 4 thereby allowing the inner component of the rigid member 4 to slide within the inferior portion of the outer component of the rigid member 3 until the desired total length of the rigid member 1 is reached at which point a push button hole in the inferior portion of the outer component of the rigid member 20 is allowed to be aligned with the push button hole in the inner component of the rigid member 21 through which a spring-loaded push button 19 may pass. It is noted that because the diameter of the superior portion of the outer component of the rigid member 2 is identical to the diameter of the inferior portion of the outer component of the rigid member 3, the linear and planar contact point characteristic is maintained along the anterior surface of the rigid member 1.

Figure 6:
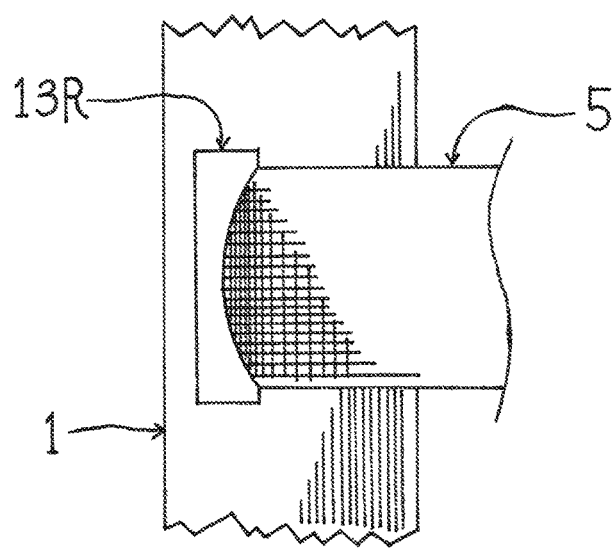
FIG. 6 is a plan right side view of a second embodiment of the belt portion of the strapping system as it relates to the rigid member.
Figure 7:
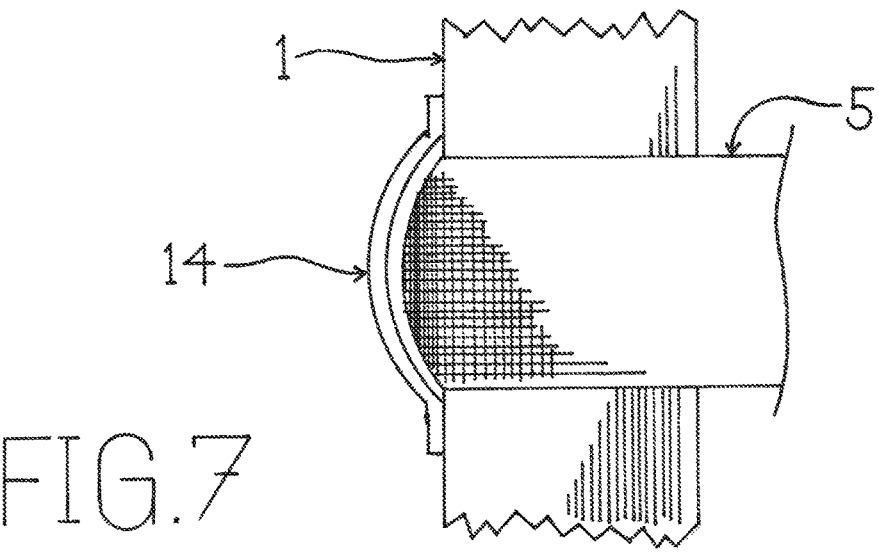
FIG. 7 is a plan right side view of a first embodiment of the belt portion of the strapping system as it relates to the rigid member.

There is shown in FIG. 6 a plan right side view of a second embodiment of the belt portion of the strapping system 5 as it relates to the rigid member 1. It comprises of a rigid member 1, a belt slot in the rigid member 13 (shown as 13R), and a belt portion of the strapping system 5. The rigid member 1 shown in FIG. 6 may be of the embodiments shown in FIG. 1, FIG. 2, FIG. 3, FIG. 4, or FIG. 5. The shown belt slot in the rigid member 13R preferably has a corresponding belt slot 13L on the opposite side of the rigid member 1 which is not shown. The belt slots in the rigid member 13R and 13L provide passage through the rigid member 1 which a belt portion of the strapping system 5 may pass. It is noted that the belt slots in the rigid member 13 are shown as existing in the rigid member 1 at a single level but they may also exist in plurality along the rigid member providing multiple sites at which a belt portion of the strapping system 5 may be secured to the rigid member 1.

There is shown in FIG. 7 a plan right side view of a first embodiment of the belt portion of the strapping system 5 as it relates to the rigid member 1. It comprises a rigid member 1, a belt portion of the strapping system 5, and a belt bracket 14. The rigid member 1 shown in FIG. 7 may be of the embodiments shown in FIG. 1, FIG. 2, FIG. 3, FIG. 4, or FIG. 5. A belt bracket 14 is shown affixed to the posterior aspect of the rigid member 1. The belt bracket 14 may have a similar construct to that of a standard door handle thereby creating a passage between the belt bracket 14 and the rigid member 1 through which a belt portion of the strapping system 5 may pass. It is noted that the belt bracket 14 is shown as existing affixed to the rigid member 1 at a single level but the belt bracket 14 and rigid member 1 are preferentially constructed such that the locus of the belt bracket 14 along the posterior aspect of the rigid member 1 is easily modifiable to meet the needs of different user sizes. This may be done by equipping the posterior aspect of the rigid member 1 with multiple sites to screw, bolt, or snap the belt bracket 14 to the rigid member 1.

Shown in FIG. 1 is a right side view of a user 9 wearing a spinal harness apparatus of the present invention. It comprises a rigid member 1, a superior portion of the outer component of the rigid member 2, an inferior portion of the outer component of the rigid member 3, an inner component of the rigid member 4, a belt portion of the strapping system 5, a suspender portion of the strapping system 6 (shown as 6R), a posterior portion of the strapping system 8, a user 9 wearing the present invention, a weight 10, an adjustable mechanism 12, and a belt slot in the rigid member 13 (shown as 13R). The shown rigid member 1 resembles the embodiments as described in FIG. 4 and FIG. 6. It is noted that although the rigid member 1 shown in FIG. 1 is as such, any combination of embodiments of a rigid member 1 described in FIG. 2, FIG. 3, FIG. 4, FIG. 5, FIG. 6, and FIG. 7 or any other embodiments by which a rigid member 1 maintains the necessary contact points along the dorsum of the user to accomplish the desired effects of the invention described herein are suitable. The user 9 is shown engaged in the deadlift exercise lifting a weight 10. It is noted that while this particular exercise is illustrated, any other activity that requires a neutral spinal position and spinal rigidity are appropriate for the purposes of the inventive spinal harness apparatus described herein. Other activities may include, but are not limited to, the squat, kettlebell exercises, core exercises such as planks, and the glute-ham developer.

Professionals that may find use of this invention may include, but not be limited to, medical doctors, physiotherapists, occupational therapists, chiropractors, athletic trainers, personal trainers, strength and conditioning coaches, and physical education instructors. Among these professionals, there may be clinical and educational applications of the invention. For example, the invention may be utilized by a health care professional with the intent to improve a patient's performance of activities of daily living.

The inventive device may also be used for other applications which require appropriate bodily positioning and technique such as occupations that require lifting and lowering of objects. For example, the inventive device may be utilized by employers to train employees handing packages and parcels to properly lift and lower packages and parcels with the intent to decrease the likeliness of injury on the job site.

It is in accordance that although conventional embodiments of the present invention have been presented and described, it is understood that potential for modifications and variations may exist without deviating from the scope of the invention. All the terms used herein, whether technical, scientific, or otherwise, are descriptive, rather than limiting, and have the same usual and customary meaning as commonly comprehended by one ordinarily skilled in the art to which this invention occupies.

The embodiments of the invention in which an exclusive property or privilege is claimed are as follows:

1. A spinal harness apparatus comprising a rigid member and a strapping system; wherein the rigid member is substantially cylindrical; wherein the rigid member is not tapered; wherein the rigid member is configured for direct contact with multiple levels of a user's body, whereby each level of contact is configured to be a direct contact between the rigid member and the user's body; wherein a contact surface of the rigid member is configured to relate to a particular two-dimensional plane at each level of contact between the contact surface and the user's body; wherein the strapping system is secured to the rigid member; wherein the strapping system is configured to secure the rigid member to the user's body; wherein the strapping system comprises a suspender portion of the strapping system and a belt portion of the strapping system; wherein the suspender portion is infinitely adjustable in length between a minimum total length of the suspender portion and a maximum total length of the suspender portion, whereby the minimum and maximum total lengths of the suspender portion are respectively configured for use by the user having a longitudinally small torso and the user having a longitudinally large torso; wherein the belt portion is infinitely adjustable in length between a minimum total length of the belt portion and a maximum total length of the belt portion, whereby the minimum and maximum total lengths of the belt portion are respectively configured for use by the user having a circumferentially small torso and the user having a circumferentially large torso; wherein terminal ends of the suspender portion are fastened to the belt portion.

2. The apparatus as recited in claim 1, wherein the suspender portion of the strapping system is fastened posteriorly to the belt portion of the strapping system by a posterior portion of the strapping system; wherein the posterior portion of the strapping system is independently adjustable in length between a minimum total length of the posterior portion and a maximum total length of the posterior portion, whereby the minimum and maximum total lengths of the posterior portion of the strapping system are respectively configured for use by the user having the longitudinally small torso and the user having the longitudinally large torso.

3. The apparatus as recited in claim 1, wherein the rigid member is singular.

4. The apparatus as recited in claim 3, wherein the rigid member possesses one or a plurality of pairs of slots through which a portion of the strapping system may pass.

5. The apparatus as recited in claim 3, wherein the rigid member possesses a bracket that is affixed to the rigid member; wherein the bracket provides a passage between the bracket and the rigid member through which a portion of the strapping system may pass.

6. The apparatus as recited in claim 3, wherein the suspender portion of the strapping system is fastened posteriorly to the belt portion of the strapping system by a posterior portion of the strapping system; wherein the posterior portion of the strapping system is independently adjustable in length between a minimum total length of the posterior portion and a maximum total length of the posterior portion, whereby the minimum and maximum total lengths of the posterior portion of the strapping system are respectively configured for use by the user having the longitudinally small torso and the user having the longitudinally large torso.

7. The apparatus as recited in claim 1, wherein a total length of the rigid member is telescopically adjustable to an infinite number of lengths between a minimum total length of the rigid member and a maximum total length of the rigid member, whereby the minimum and maximum total lengths of the rigid member are respectively configured for use by the user having a short stature and the user having a tall stature.

8. The apparatus as recited in claim 7, wherein the suspender portion of the strapping system is fastened posteriorly to the belt portion of the strapping system by a posterior portion of the strapping system; wherein the posterior portion of the strapping system is independently adjustable in length between a minimum total length of the posterior portion and a maximum total length of the posterior portion, whereby the minimum and maximum total lengths of the posterior portion of the strapping system are respectively configured for use by the user having the longitudinally small torso and the user having the longitudinally large torso.

\* \* \* \* \*